US007789333B2

(12) United States Patent
Zakheim et al.

(10) Patent No.: US 7,789,333 B2
(45) Date of Patent: Sep. 7, 2010

(54) MEDIA MILL PROCESS

(75) Inventors: Howard Zakheim, Bala Cynwyd, PA (US); Jiang Hong, Wallingford, PA (US); Alexander K. Sorser, West Bloomfield, MI (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1754 days.

(21) Appl. No.: 10/282,462

(22) Filed: Oct. 29, 2002

(65) Prior Publication Data

US 2003/0089277 A1 May 15, 2003

Related U.S. Application Data

(60) Provisional application No. 60/336,290, filed on Nov. 2, 2001.

(51) Int. Cl.
*B02C 1/00* (2006.01)
(52) U.S. Cl. .......................................... 241/21; 241/184
(58) Field of Classification Search ................... 241/21, 241/184
See application file for complete search history.

(56) References Cited

U.S. PATENT DOCUMENTS 3,210,016 A 10/1965 Sevin et al.
5,022,592 A 6/1991 Zakheim et al.
5,085,698 A 2/1992 Ma et al.
5,231,131 A 7/1993 Chu et al.
5,272,201 A 12/1993 Ma et al.
5,519,085 A 5/1996 Ma et al.
5,891,231 A * 4/1999 Gnerlich et al. .......... 106/31.86
6,267,807 B1 7/2001 Harshbarger et al.
2002/0003179 A1 1/2002 Verhoff et al.
2002/0047058 A1 4/2002 Verhoff et al.
2002/0119200 A1 8/2002 Haskell

FOREIGN PATENT DOCUMENTS

WO WO01/94476 A3 12/2001

OTHER PUBLICATIONS

Admitted Acknowledgement Prior Art (AAPA)—p. 1, lines 13-14, p. 4, lines 1-3, 15-17 and p. 5, lines 14-19 of the disclosed speciification.
*
International Search Report Dated Jan. 11, 2002 PCT/US02/26417.

* cited by examiner

*Primary Examiner*—Bena Miller
(74) *Attorney, Agent, or Firm*—Angela J Grayson; Simon L Xu

(57) ABSTRACT

This invention relates to the preparation of particle dispersions in a media mill using plastic, substantially cubic media to effect particle size reduction and/or dispersion of the particles.

15 Claims, No Drawings

MEDIA MILL PROCESS

CROSS-REFERENCE TO RELATED APPLICATION

This application claims priority under 35 U.S.C. §119 from U.S. Provisional Application Serial No. 60/336,290 (filed Nov. 2, 2001), which is incorporated by reference herein as if fully set forth.

BACKGROUND OF THE INVENTION

This invention relates to the preparation of particle dispersions in a media mill. More particularly, this invention relates to an improved media mill process wherein there is good fluidization of the media, predictable scale up behavior, efficient particle size reduction, low contamination and improvements to the performance of the final dispersion.

Media mills are being increasingly used for the milling of colorants in inks and coatings, such as automotive paints. Such mills can grind materials, but more typically they act to de-agglomerate particles and promote dispersion.

Conventional media mills used in commercial production usually comprise a chamber equipped with an agitator wherein milling is accomplished by fluidizing media with slurry. The slurry is usually fed continuously and there is usually a separator screen at the chamber exit to allow the passage of slurry and retention of media.

Smaller media allow more efficient milling and ultimately smaller particle size; however, as media gets smaller it becomes harder to separate, and pressure build up at the separator (due to hydraulic packing) becomes unacceptable. For most commercial applications, 0.35 mm media is considered the practical lower limit.

Better fluidization of the media provides faster, more efficient milling. The art of U.S. Pat. No. 5,022,592 (Zakheim et al.) is directed to improved fluidization.

For particularly demanding end use applications, such as the production of ink jet inks and automotive paints, the nature of the media is important. Friable media, such as glass and ceramics, can leave shards of fractured media in the dispersion that can clog narrow passages of ink jet printheads. Metallic media such as stainless steel and zirconium leave traces of metal in the dispersion that cause discoloration and, in some cases, electrical malfunction of the printhead. Zirconium contamination can also negatively affect appearance of automotive coatings by, for example, reducing transparency of aluminum- and mica-containing colors.

To avoid some of the problems of media contamination, U.S. Pat. No. 5,891,231 (Gnerlich et al.) teaches the use of plastic media preferably made of polystyrene and preferably spherical in shape.

The above-mentioned disclosures are incorporated by reference herein for all purposes as if fully set forth.

There is still need for improved media milling methods, especially for the production of colorant dispersions for high performance end use applications such as ink jet ink and exterior paints for vehicles such as automobiles and trucks.

SUMMARY OF THE INVENTION

The use of cubic media was generally mentioned in previously incorporated U.S. Pat. No. 5,891,231, but spherical media was taught as being preferred. In fact, there is a general belief in the field that the only viable media shape, at least for any sort of commercial media milling operation, is a sphere and that if media are employed which have sharp edges—such as a cube—it would fluidize poorly and just tend to grind itself rather than the slurry. In contrast, it has now been surprisingly found that plastic media which is substantially cubic in shape is advantageous for milling and durable to attrition, and is particularly effective for the preparation of ink jet and automotive colorant dispersions.

Accordingly, the present invention provides a method for making a colorant dispersion, comprising the step of milling a colorant slurry in a media mill with plastic, substantially cubic media under conditions to effect particle size reduction and/or dispersion of the colorant.

The present invention also provides an improved method for milling a colorant slurry to effect particle size reduction and/or dispersion of the colorant, the method comprising the step of milling the colorant slurry in a media mill in the presence of a milling media, wherein the improvement comprises that the milling media is a plastic, substantially cubic milling media.

In a particularly preferred embodiment, the colorant is an ink jet ink colorant and the colorant dispersion is suitable for making an ink jet ink.

In another preferred embodiment, the colorant is an automotive paint colorant and the colorant dispersion is suitable for making exterior paints for vehicles such as automobiles and trucks. For example, the dispersions of this invention can be added to a variety of automotive coating or paint compositions such as primers, primer surfacers, topcoats which may be monocoats, or basecoats of a clearcoat/basecoat or tricoat finish. In this application, pigments are typically introduced into the coating by first forming the colorant dispersion with appropriate carrier and any of the film forming polymers used in the coating composition or with another compatible polymer or dispersant. The colorant dispersion is then blended with the other constituents used in the coating composition. The jetness of the coating is improved when the coating is prepared with plastic cubic media in a media mill in comparison to base carbon black dispersions processed with conventional media mill grinding which use spherical grinding media.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

DETAILED DESCRIPTION OF THE PREFERRED EMBODIMENTS

As indicated above, the media used in the instant invention is plastic and substantially cubic. By "substantially" cubic is meant that the media is cubic in nature but the dimensions, corners and corner angles of need not be exactly those of a perfect cube. For example, cubic media can be made via extrusion processes and may, as a result of the manufacturing process, have slightly rounded corners, edge dimension that are not perfectly equal, some corner angles that are not exactly square, or other minor "irregularities". "Substantially" cubic, therefore, is meant to include those materials that are considered cubic within the tolerances generally allowed within their commercial manufacture, as will be understood by one of ordinary skill in the art.

The preferred size of the substantially cubic media (edge dimension) is about 0.3 to 1.0 mm, more preferably about 0.35 to 0.80 mm, and most preferably about 0.5 mm. It is preferred that all of the cubic media have substantially the same size. "Substantially" in this context is intended to include variances within normal commercial manufacturing tolerances, as is well understood by those of ordinary skill in the art.

As previously mentioned, facile fluidization of the media is advantageous to mill performance. One way to assist fluidization is to match the density of the media to that of the slurry being milled. This, however, is not common practice. Taking for example the preparation of an ink jet ink dispersion, the carrier is usually water and the particles being milled are typically organic pigment colorants. As such, the density (at ambient temperature) of a 15-20 wt % colorant slurry (based on the total weight of the slurry) is typically between about 1.05 to about 1.25 g/mL. Media made of the usual material like silica, ceramics, and metals have a specific gravity much greater than the slurry density and tend to settle to the bottom of milling chamber. It takes great energy to fluidize the media and there are frequently regions of inhomogeneity.

The density of the plastic media is thus preferably a substantial match of the density of the slurry being milled. In this context, it is preferred that the specific gravity of the media is greater than or equal to that of water, and is within about +/−20%, more preferably within about +/−15%, and especially with about +/−10%, of the slurry being milled. From the standpoint of end use application in making ink jet ink or exterior paint colorant dispersions, the media preferably has a specific gravity between about 1.0 and about 1.3, more preferably between about 1.04 and about 1.25, most preferably about 1.07 and about 1.2.

The plastic is preferably a tough engineering plastic such as a polyamide nylon (specific gravity generally about 1.14) or polycarbonate (specific gravity generally about 1.2). Plastic also includes a plastic material that is filled or composited. A particularly preferred plastic is a polyamide nylon, which has been found to be a good match to the ink jet slurries and exterior paint slurries of particular interest here and, when used in combination with such slurries, has demonstrated good fluidization.

The slurries to be milled can be those that contain insoluble colorants. The colorants are typically inorganic and organic pigments, dispersed dyes and the like. Also included are colorants which have been surface treated such as those described as "self-dispersing" (see WO01/94476 which is incorporated by reference herein for all purposes as if fully set forth). The colorant loading is typically between 10 and 30% by weight, preferably between about 15 to 20% by weight, based on the total slurry weight.

Dispersions for automotive paints and the like are based on pigments, both inorganic and organic. Since inorganic pigments generally have higher densities in comparison with organic pigments, the density of the automotive dispersions may be as high as 1.35 g/mL (1.05 to 1.35).

In contrast with jet ink application, where the requirement for pigment particle size is to effectively hide the substrate (paper) without clogging narrow passages of ink jet printheads, automotive color dispersions need to be very transparent for the aluminum and mica containing paints and very jet (opaque) for black paints. The appropriate high degree of transparency or jetness, as the case may be, requires effective pigment particle size reduction during dispersion processing through the mill. In fact, the highest possible degree of pigment deagglomeration is desirable and is typically results in enhance appearance and better pigment utilization.

The carrier is preferably, although not necessarily, aqueous based. Aqueous based means comprised of water and optionally water-soluble co-solvents. The carrier can contain dispersant, defoamer and/or any other useful formulating ingredient. As used herein, colorant slurry and colorant dispersion mean essentially the same thing, but reference to dispersion generally indicates a finished slurry which is completely milled.

The mill can be any convenient mill, including those commercially available from Netzsch, Inc. (Exton, Pa.) and Premier Mill (Reading, Pa.). To reduce metal contamination, the mill rotating parts that contact the slurry are preferably plastic or plastic-lined. The instant invention is particularly advantageous for mills that operate in continuous mode. The instant invention is furthermore particularly advantageous for commercial scale milling operations, where the milling chamber is at least 1.5 liters in volume, more preferably at least 15 liters in volume. The general details of suitable mills and milling conditions are well known to those of ordinary skill in the relevant art.

The colorant dispersions prepared according to the present invention are especially useful for making ink jet ink and colorants for exterior paints for vehicles. In the case of ink jet dispersions, which are generally higher in colorant concentration than required for finished ink (concentrates), the dispersions are mixed with appropriate formulating ingredients, and diluted as needed, to obtain an ink with the desired properties.

The ink formulating ingredients can include one or more of dispersants, wetting agents, binders, defoamers, humectants and co-solvents, as is well known to those of ordinary sill in the relevant art.

Further details on ink jet inks, components and formulations are in general well known to those of ordinary skill in the art, as exemplified by previously incorporated U.S. Pat. No. 5,891,231 and WO01/94476, as well as U.S. Pat. No. 5,085,698, U.S. Pat. No. 5,231,131, U.S. Pat. No. 5,272,201 and U.S. Pat. No. 5,519,085, all which are also incorporated by reference herein for all purposes as if fully set forth.

The same considerations are relevant to automotive paints, where pigment dispersions are usually blended with other well-known components in accordance with normal paint-forming techniques. For exterior paint formulations, the slurries may contain other paint formulating constituents including one or more of dispersants, wetting agents, binders, crosslinking agents, catalysts, defoamers, UV fortifiers, rheology control agents, and co-solvents and other additives as necessary to assure stability, wetting and application, as are well known to those of ordinary skill in the relevant art.

For these exterior paint formulations, an automotive paint can consist of paint that is a primer, primer surfacer, or topcoat which may be a monocoat or basecoat of a clearcoat/basecoat or tricoat finish.

Further details on dispersion of colorants for exterior paints for vehicles such as automobile and trucks, components and formulations are in general well known to those of ordinary skill in the art.

Exterior paints for vehicles such as automobiles and trucks prepared using subtantially cubic grinding media in a media mill result in a paint, especially black paint, which can have good fluidization of the media, predictable scale up behavior, efficient particle size reduction, low contamination and improvements to the performance of the final dispersion, as well as improved jetness of the final coating.

EXAMPLES

Example 1

Polyamide Cubic Media Compared to Polystyrene and Zirconium Oxide Spherical Media for Ink Jet Formulations Three types of media were selected to make ink concentrate dispersions. The media physical properties are shown in Table 1.

TABLE 1

Physical properties of media*

| Media type | Specific gravity | Bulk density (kg/L) | Media size (mm) | Media shape |
|---|---|---|---|---|
| Polyamide | 1.13 | 0.61 | 0.5 | Cubic |
| Polystyrene | 1.03 | 0.65 | 0.5 | Spherical |
| Zirconium Oxide | 6.10 | 3.50 | 0.5 | Spherical |

*From Norstone, Inc., Wyncote, PA

Three separate aqueous premix slurries of blue pigment were prepared by mixing the following ingredients as shown in Table 2. Liquid ingredients were loaded into a 2.5-gallon High Speed Disperser (HSD) first. After the liquid ingredients were mixed for 30 minutes at low speed (1000 rpm), blue pigment was loaded. Then HSD speed was increased to 4000 rpm to mix all ingredients for 2 hours.

TABLE 2

HSD premix slurry components

| Component | Amount (g) |
|---|---|
| Deionized water | 2348.0 |
| 45% KOH | 370.0 |
| Acrylic block co-polymer dispersant* | 2907.0 |
| Phthalocyanine blue 15:3 | 1875.0 |

*13//13/7.5 benzylmethacrylate//methacrylic acid/ethoxytriethyleneglycolmethacrylate Once the HSD premix slurry was prepared, it was transferred into a 5-gallon process tank equipped with a low speed agitator (<250 rpm). In this agitator tank, an additional 2917.0 g deionized water was added to dilute the premix so that it was suitable for media milling. The specific gravity of this final premix slurry was 1.12.

A 2.0 liter Supermill SM2 (Premier Mill, Reading, Pa.) was used as media mill to process these three aqueous slurries, 2.5-gallon each, by employing three different types of media. Operating conditions for SM2 are as follows: 85% media load, 2.5 GPH product flowrate, 2400 FPM mill speed and 0.2~0.3 mm screen. A peristaltic pump (Randolph M500) was used to feed the slurries from the bottom of agitator tank through SM2 back to the top of agitator tank. This re-circulation media milling was conducted for 16 hours with residence time of 102.8 minutes.

After milling was complete, each slurry was analyzed for mean particle size and cumulative particle size distribution by Microtrac UPA-150 (Largo, Fla.) with a dilution factor below 1. Table 3 shows mean particle size and its reduction for three different media. It can be seen that substantially cubic polyamide media leads to smallest mean particle size, about 20% lower than that of spherical polystyrene media. On a normalized basis to compare direct particle size reduction, pigment agglomerate size in premix can be ground to lowest level by polyamide media. Given the similar specific gravity between polyamide (1.13) and polystyrene (1.03), the difference in media shape, i.e. cubic vs. spherical, is attributed to the difference in particle size. Table 3 shows a 15% particle size reduction improvement can be realized by utilizing polyamide cubic media instead of same size polystyrene spherical media.

As for zirconium oxide media, it did not result in a grinding effect better than polyamide media indicating higher material density is not clearly advantageous in terms of mean particle size reduction. Moreover, metal contamination due to the use of hard zirconium type of media may cause ink discoloration and possible failure of printheads. Zirconium oxide is therefore not preferred to make ink dispersion.

TABLE 3

Mean particle size and its reduction for different media

| Media | Premix | Final dispersion | Reduction |
|---|---|---|---|
| Polyamide | 109.3 nm | 63.1 nm | 42.3% |
| Polystyrene | 109.1 nm | 78.8 nm | 27.8% |
| Zirconium Oxide | 106.1 nm | 70.0 nm | 34.0% |

Table 4 shows cumulative particle size distributions for final dispersions made by polyamide, polystyrene and zirconium oxide media. Again, polyamide media consistently leads to lower particle size than polystyrene over full range. This further demonstrates the advantage and improvement of employing 0.5 mm cubic polyamide media over 0.5 mm spherical polystyrene media.

TABLE 4

Cumulative particle size distribution of final dispersions

| Percentile | Polyamide | Polystyrene | Zirconium Oxide |
|---|---|---|---|
| 10 | 36.1 nm | 45.4 nm | 39.8 nm |
| 20 | 42.4 nm | 53.9 nm | 47.2 nm |
| 30 | 48.7 nm | 62.1 nm | 54.6 nm |
| 40 | 55.5 nm | 70.2 nm | 62.2 nm |
| 50 | 63.1 nm | 78.8 nm | 70.0 nm |
| 60 | 71.7 nm | 88.3 nm | 78.5 nm |
| 70 | 82.3 nm | 99.6 nm | 88.4 nm |
| 80 | 97.2 nm | 114.5 nm | 101.0 nm |
| 90 | 123.3 nm | 138.7 nm | 120.4 nm |
| 95 | 150.7 nm | 163.1 nm | 138.4 nm |

Example 2

Durability of Polyamide Cubic Media

Polyamide cubic media was found to be very durable during intensive grinding. A test showed that with continuous media milling of 8 different blue pigment 15:3 premix batches (2.5 gallon each, each milling for 40 hours) prepared by the method described above for 320 hours, mean particle size of final dispersion can still be reduced below 75 nm. A visual examination under microscope showed polyamide cube did not lose its shape in any substantial way, which indicates grinding efficiency will not be decreased significantly over long milling time. Usually, small media mill has higher grinding energy per unit volume of dispersion inside the mill compared to bigger scale media mill. It is therefore possible in larger commercial scale media mill, such as 45 liter Premier Supermill2, polyamide media will last 3 times longer than in 2 liter Premier Supermill2 before it loses grinding efficiency.

Example 3

Automotive Coating

Two carbon black pigment dispersions were prepared using the same dispersion compositions and dispersion processing with the only difference being the type of media. The control and experimental dispersions were made using ER 120S 0.6-0.8 mm zirconia (from SEPR, Ohio) and cubic nylon media, respectively.

Both dispersions contain the following ingredients (%, wt.):

| | |
|---|---|
| Deionized water | 67.9 |
| AMP-95 | 1.8 |
| Defoamer (Surfynol 104 DPM, Air Products) | 0.3 |
| AB block copolymer (as described in the US6204319) | 20.0 |
| Carbon black pigment (Raven 5000 Ultra II from Columbian Chemicals) | 10.0 | and had a solids content of 15.37% and a dispersant to pigment ratio of 53.7/100.

11800 g each (3 gallon) premixes were prepared using HSD for 1 hour. Then, these premixes were processed through 2.0 L LMZ mill from Netzsch, Inc. (Exton, Pa.). Processing parameters were as follows: 85% media, 2250 RPM rotor speed, and 525 gram per minute product flow rate, 240 minutes grind time. Every 30 minutes a dispersion sample was taken for jetness evaluation.

Jetness was measured based on the following coating composition:

| | |
|---|---|
| 2.1% solution of Laponite RD (from Rockwood Additives) | 28.7 g |
| Acrylic latex (30.0% solids in an aqueous medium of polymer of methyl methacrylate, allyl methacrylate, butyl acrylate, hydroxy ethyl acrylate, methacrylic acid) | 28.6 g |
| DI water | 15.3 g |
| Polyurethane resin Sunprene UX-5100 (from Sanyo Chemical Industries) | 5.8 g |
| Ethylene glycol monobutylether | 5.9 g |
| 2-hexhylene glycol monobutylehter | 1.1 g |
| Heavy naphtha | 3.1 g |
| Defoamer (Surfynol 104 from Air products) | 0.7 g |
| "Cymel 301" (melamine from Cytec Industries) | 5.0 g |
| Tinuvin 384-2 (from Ciba) | 0.2 g |
| 40.8% solution of Nacure XP-221 (aromatic sulfonic acid from King Industries) | 0.8 g |
| Colloidal dispersion (65.6% solids in an aqueous medium of polymer of methyl methacrylate, butyl methacrylate, hydroxy ethyl acrylate, acrylic acid) | 4.8 g |
| Carbon Black Pigment Dispersion (prepared above) | 30.0 g |
| Total | 130.0 g |

The coating compositions were applied onto a substrate and overcoated with a clearcoat.

Each of the panels was measured for jetness of color. Jetness is a color measurement for black films. A full description of measuring Jetness is in a publication by Degussa Corporation, "Coloristic Measurements of Jet-Black and Grey Coatings," Technical Bulletin on Pigments, No. 37, 1994 and is hereby incorporated by reference. The Jetness No. is a function of L, a and b values measured at a 10 degree angle using a standard spectrophotometer and the Jetness No. is calculated using equations in the above publication. The Jetness No. increases with decreasing L, a and b values. Therefore, a desirable black basecoat with darker bluer color and less redness has a higher Jetness No. The Jetness No. for each of the samples is shown below.

| Grind time (min.) | SERP (zirconia) | Cubic nylon |
|---|---|---|
| 30 | 258.8 | 281.3 |
| 60 | 263.8 | 282.7 |
| 90 | 266.3 | 282.2 |
| 120 | 265.5 | 285.0 |
| 150 | 267.2 | 284.0 |
| 180 | 267.5 | 289.4 |
| 210 | 267.6 | 294.6 |
| 240 | 267.2 | 292.3 |

The above results show that automotive coatings containing dispersion made with nylon media is about 25 units jetter in comparison with zirconia media counterpart.

The jetness data was confirmed by particle size measurements. The final dispersions (at 240 minutes grind time) were analyzed for mean particle size and particle size distribution using Microtrac UPA-150 with a dilution factor below 1. Data below shows that mean pigment particles are smaller for the dispersion made with cubic nylon in comparison with zirconia media. Also, particle size distribution is shifted toward smaller particles for cubic nylon vs. zirconia media.

| Media | Mean particle size | % < 0.204 microns | 95% finer (microns) |
|---|---|---|---|
| Zirconia | 103.1 | 88.29 | 255.0 |
| Cubic nylon | 75.8 | 94.67 | 207.7 |

The invention claimed is:

1. A method for making a colorant dispersion, comprising the step of milling a colorant slurry in a media mill with plastic cubic media under conditions to effect particle size reduction or dispersion of the colorant, wherein the media is 0.35 to 0.8 mm in size.

2. The method of claim 1, wherein the specific gravity of the media is greater than or equal to that of water, and is within about +/−20% of the slurry being milled.

3. The method of claim 2, wherein the colorant loading in the slurry is between 10 and 30% by weight based on the total slurry weight.

4. The method of claim 3, wherein specific gravity of the media is in the range of about 1.0 to 1.3, and the density of the slurry is in the range of about 1.05 to about 1.35 g/mL.

5. The method of claim 4, wherein the media is comprised of a polyamide nylon.

6. The method of claim 2, wherein the specific gravity of the media is greater than or equal to that of water, and is within about +/−15% of the slurry being milled.

7. The method of claim 1, wherein specific gravity of the media is in the range of about 1.0 to 1.3, and the density of the slurry is in the range of about 1.05 to about 1.35 g/mL.

8. The method of claim 1, wherein specific gravity of the media is in the range of about 1.0 to 1.3, and the density of the slurry is in the range of about 1.05 to about 1.25 g/mL.

9. The method of claim 1, wherein the media is comprised of a plastic selected from polyamide and polycarbonate.

10. The method of claim 1, wherein the media is comprised of a polyamide nylon.

11. The method of claim 1, wherein the milling is conducted in a media mill operating in continuous mode.

12. The method of claim 1, wherein the media mill comprises a milling chamber with a volume of at least 1.5 liters.

13. The method of claim 12, wherein the media mill comprises a milling chamber with a volume of at least 15 liters.

14. The method of claim 1, wherein the colorant slurry is aqueous based.

15. The method of claim 1, wherein the colorant is a pigment.

* * * * *